United States Patent
Shrivastava et al.

(10) Patent No.: US 11,438,836 B2
(45) Date of Patent: Sep. 6, 2022

(54) METHODS AND SYSTEMS FOR MANAGING SCPTM SERVICES

(71) Applicant: SAMSUNG ELECTRONICS CO., LTD., Suwon-si (KR)

(72) Inventors: Vinay Kumar Shrivastava, Bangalore (IN); Ankit Srivastav, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 56 days.

(21) Appl. No.: 16/719,225

(22) Filed: Dec. 18, 2019

(65) Prior Publication Data
US 2021/0051582 A1 Feb. 18, 2021

(30) Foreign Application Priority Data
Aug. 16, 2019 (IN) .............................. 201941033050

(51) Int. Cl.
| | |
|---|---|
| *H04W 4/06* | (2009.01) |
| *H04W 52/02* | (2009.01) |
| *H04W 72/02* | (2009.01) |
| *H04W 72/04* | (2009.01) |
| *H04W 72/00* | (2009.01) |
| *H04L 5/00* | (2006.01) |
| *H04W 72/10* | (2009.01) |

(52) U.S. Cl.
CPC ....... *H04W 52/0216* (2013.01); *H04L 5/0032* (2013.01); *H04W 72/005* (2013.01); *H04W 72/02* (2013.01); *H04W 72/044* (2013.01); *H04W 72/10* (2013.01)

(58) Field of Classification Search
CPC ............ H04L 5/0032; H04W 52/0216; H04W 72/005; H04W 72/02; H04W 72/044; H04W 72/10
See application file for complete search history.

(56) References Cited

U.S. PATENT DOCUMENTS

| | | | |
|---|---|---|---|
| 8,477,644 B2 * | 7/2013 | Sugawara | H04W 72/1231 370/252 |
| 2017/0332215 A1 * | 11/2017 | Lin | H04L 12/189 |
| 2018/0014246 A1 * | 1/2018 | Chang | H04W 48/18 |
| 2018/0092085 A1 * | 3/2018 | Shaheen | H04W 36/14 |

(Continued)

FOREIGN PATENT DOCUMENTS

| | | |
|---|---|---|
| EP | 3079421 | 10/2016 |
| WO | 2017/039211 | 3/2017 |
| WO | 2017/082660 | 5/2017 |

*Primary Examiner* — Phuc H Tran
(74) *Attorney, Agent, or Firm* — F. Chau & Associates, LLC

(57) ABSTRACT

Embodiments herein provide methods and systems for managing and optimizing reception of SCPTM services. The services can be prioritized based on the attributes of the services. Based on the priorities the services can be received if there is a conflict in scheduling the reception of the services. The services can be scheduled in multiple RF carriers, if a single RF carrier cannot support receiving all the services to be received. The number of services that can be supported for reception can be informed to a network, which can optimize the scheduling of the services. The network can multiplex plurality of services in a single G-RNTI. The variations in SC-MCCH duration of a service can be known by monitoring DCI at modification period boundaries of a service.

19 Claims, 8 Drawing Sheets

(56) References Cited

U.S. PATENT DOCUMENTS

| | | | | |
|---|---|---|---|---|
| 2018/0145839 A1* | 5/2018 | Lee | ...................... | H04W 76/40 |
| 2018/0160398 A1 | 6/2018 | Park et al. | | |
| 2018/0270622 A1* | 9/2018 | Kim | ...................... | H04W 4/06 |
| 2018/0270723 A1 | 9/2018 | Kim et al. | | |
| 2018/0352387 A1* | 12/2018 | Kim | ...................... | H04W 48/10 |
| 2019/0364492 A1* | 11/2019 | Azizi | ................ | H04W 52/0264 |
| 2020/0100213 A1* | 3/2020 | Chandramouli | .... | H04L 12/1881 |
| 2020/0100325 A1* | 3/2020 | Chang | ................... | H04W 76/14 |
| 2020/0187170 A1* | 6/2020 | Shin | ........................ | H04J 11/00 |

* cited by examiner

METHODS AND SYSTEMS FOR MANAGING SCPTM SERVICES

CROSS REFERENCE

This application claims priority to, and the benefit of, Indian Patent Application No. 201941033050 filed on Aug. 16, 2019. The entire contents of the foregoing application are hereby incorporated by reference for all purposes.

TECHNICAL FIELD

Embodiments herein relate to Single-Cell Point-to-Multipoint (SCPTM) transmission, and more particularly to methods and systems for managing SCPTM services.

BACKGROUND

Single-Cell Point-to-Multipoint (SCPTM) communications can provide public services or critical services to a group of User Equipments (UEs) camped in a cell. Prior to SCPTM, broadcast services were provided using technology including the evolved Multimedia Broadcast Multicast Service (eMBMS) of Long Term Evolution (LTE) (also known as LTE broadcast). Broadcast/multicast transmission may involve exclusive allocation of radio resources over a single or multiple cells. SCPTM involves group communication wherein UEs receiving the same service within a single cell are grouped together. The radio resource allocation for the group communication may be dynamic or flexible. That is, radio resources can be allocated based on real time traffic load. The dynamic allocation of radio resources may ensure efficient radio resource utilization by taking into account the mobility of users, and may provide the capability to meet the latency requirements of different services, as well as time-varying service load requirements on the network, and so on.

The SCPTM configuration may be communicated to UEs via system information messages. In some cases, changes in the system information may be communicated to UEs through paging, and multiple UEs in a cell may receive and decode the same changes to the system information. However, some of the UEs that receive the system information changes may not be using any SCPTM service. For such UEs, decoding the changes in system information related to SCPTM may be an inefficient use of power.

SUMMARY

Accordingly, embodiments of the present disclosure provide methods and systems for managing reception of Single Cell Point to Multipoint (SCPTM) services by a User Equipment (UE). The embodiments include assigning priorities to different SCPTM services to be received by the UE. The embodiments include providing cross-layer identifiers which facilitate the lower layers to identify attributes of a specific SCPTM service that is being received. The embodiments allow exchange of information between the higher and lower layers. The information includes attributes of the received SCPTM services. Based on the attributes of different SCPTM services, the priorities can be assigned accordingly. The priorities can be communicated to the lower layers. Based on the priorities, the lower layers can choose to decode services having greater priority in comparison with services assigned with lower priority. The lower layers can exercise the choice when there is an issue in scheduling the services due to requirement for receiving multiple services (greater than the number of services supported for reception by the UE) at the same time assigned with differing priorities.

Thus, systems and methods are described for managing reception of Single Cell Point to Multipoint (SCPTM) services, the method comprising assigning, by a UE, priorities to SCPTM services configured for reception by the UE; determining, by the UE, if a number of SCPTM services to be received by the UE is greater than a number of SCPTM services supported by the UE for reception, wherein the number of SCPTM services to be received by the UE comprises a number of SCPTM services currently being received by the UE and at least one additional SCPTM service whose service period is being initiated, wherein the initiation of the service period indicates a requirement to receive the at least one additional SCPTM service; and selecting, by the UE, SCPTM services to be received by the UE amongst the SCPTM services currently being received by the UE and the at least one additional SCPTM service based on the priorities assigned to the SCPTM services currently being received by the UE and the priorities assigned to at least one additional SCPTM service, wherein a number of selected SCPTM services is less than or equal to the number of SCPTM services supported by the UE for reception.

In an embodiment, services can be availed over unicast if the services cannot be availed over SCPTM. In an embodiment, a trigger can be sent to a middleware/application for indicating inability to schedule a service.

In an embodiment, at least one Radio Frequency (RF) carrier can be utilized for decoding at least one service. The embodiments include availing services from neighboring cells by synchronizing RFs with the neighboring cells, wherein the services availed from the neighboring cells can be decoded through the RFs, In an embodiment, information can be provided to the network about number of services that can be simultaneously decoded by the UE. Based on this information, the network can optimize the scheduling of at least one service.

In an embodiment, transmissions can be decoded, which comprise of a plurality of services multiplexed in a higher layer payload with embedded identifiers. The multiplexing can be performed by the network. The decoding can be performed by the UE at the lower layers. At the higher layers, the decoded transmissions can be de-multiplexed to retrieve the individual services. The higher layer can be Long Term Evolution (LTE) protocol layer 2, or Transport Control Protocol/Internet Protocol (TCP/IP), application layer, and so on.

In an embodiment, multiple services can be decoded through multiple antennas, wherein the services can be spatially multiplexed by the network and indicated by DCI on single G-RNTI.

In an embodiment, Downlink Control Information (DCI) can be used for notifying changes in duration of Single Carrier-Multicast Control Channel (SC-MCCH).

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION

This invention is illustrated in the accompanying drawings, throughout which like reference letters indicate corresponding parts in the various figures. The embodiments herein will be better understood from the following description with reference to the drawings, in which.

Figure 5A:
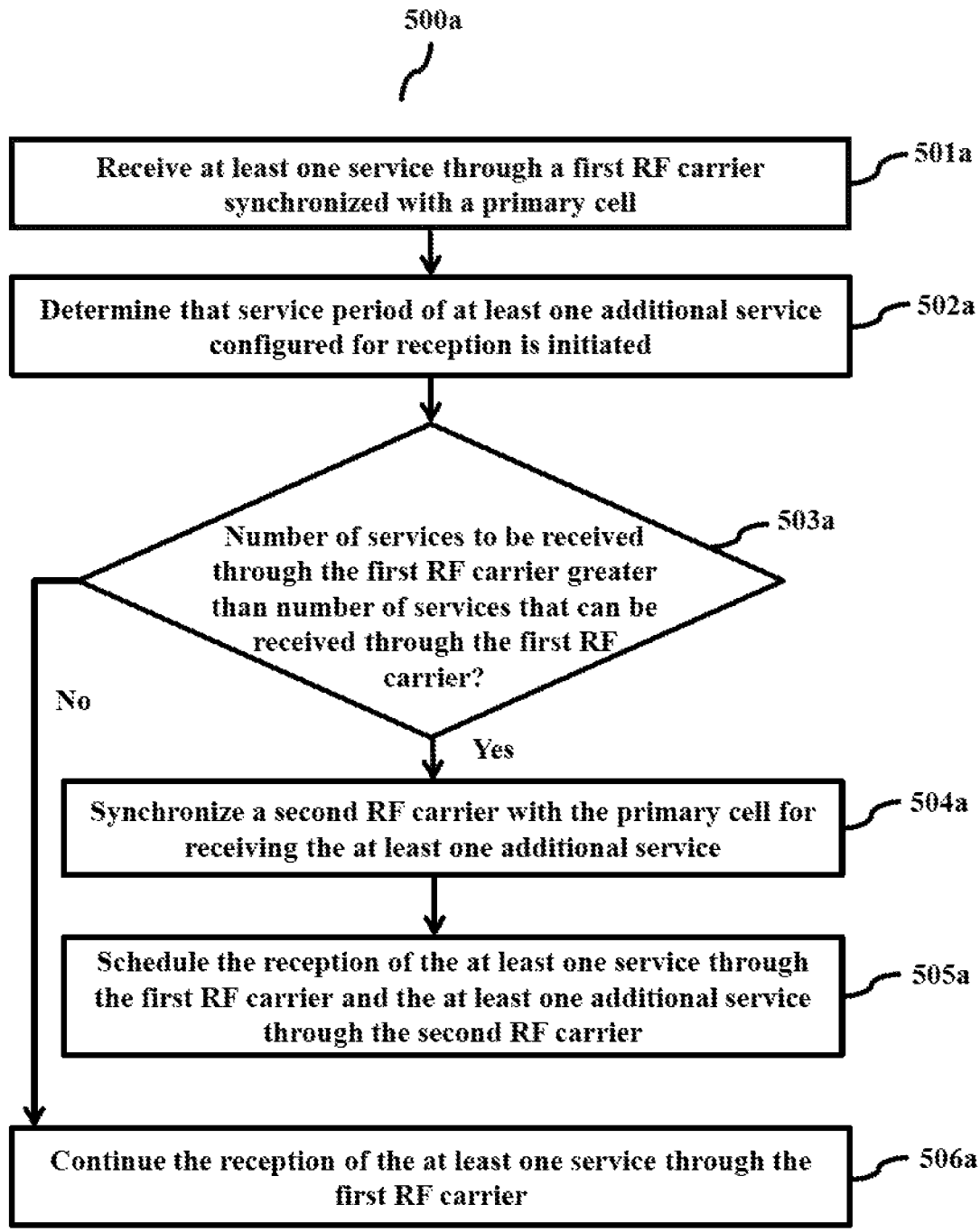
FIG. 5a is a flowchart depicting a method for managing SCPTM services, according to embodiments as disclosed herein.
Figures 1, 5B:
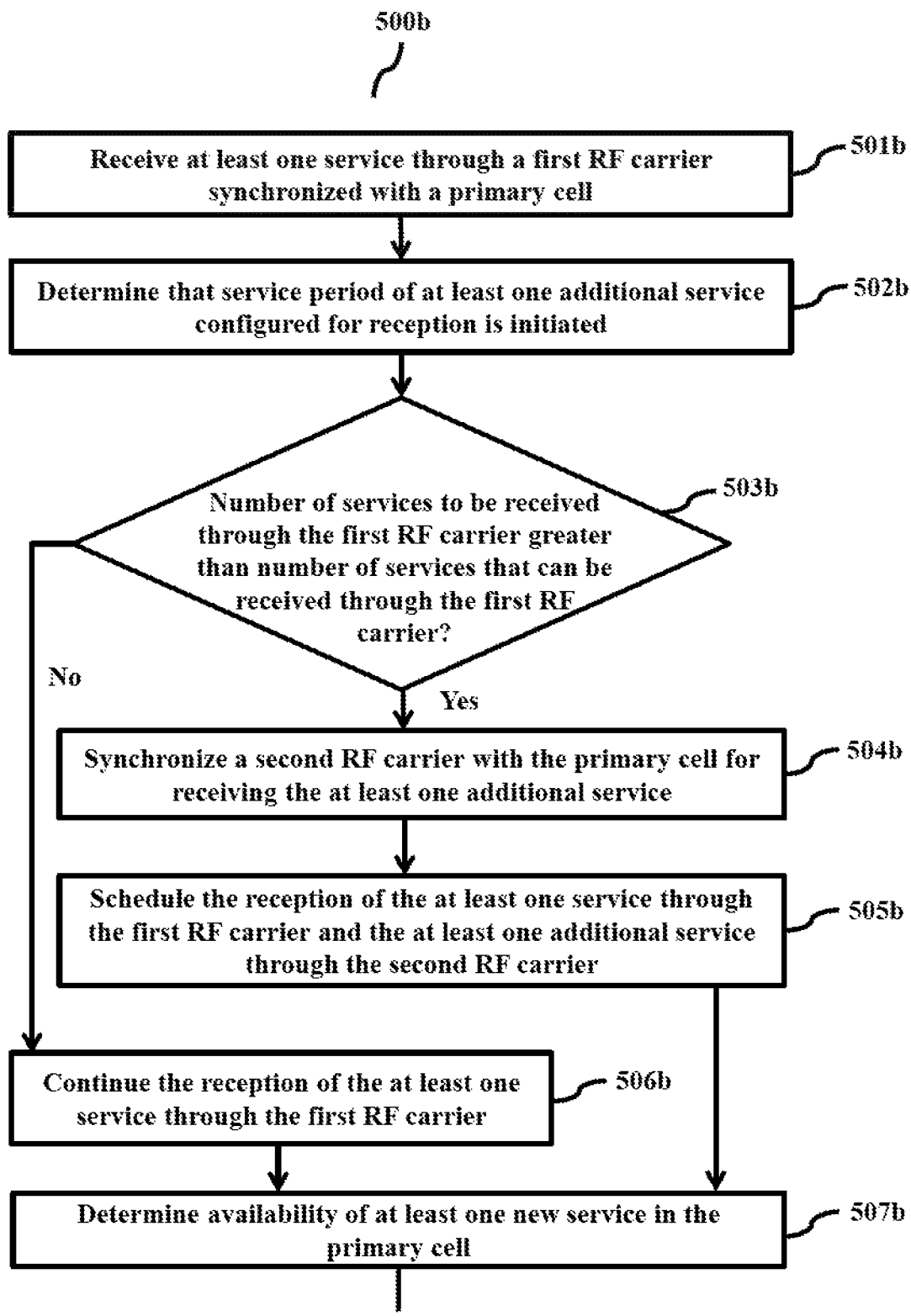
Figures 2, 5B:
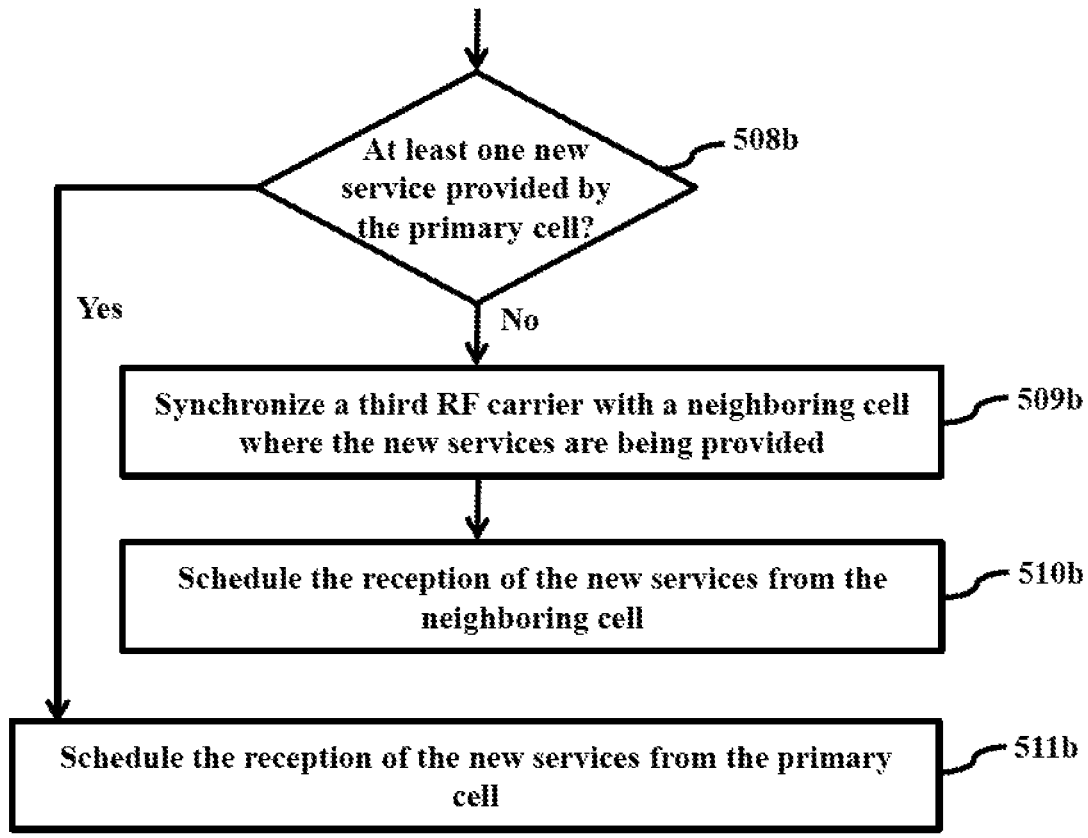
Figure 6:
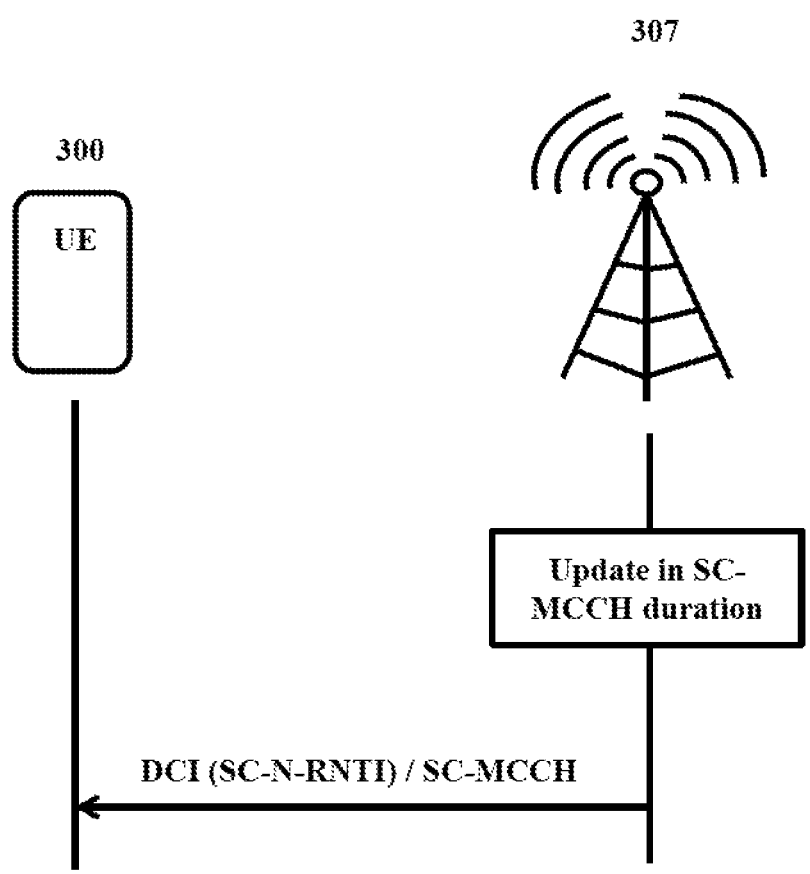

FIG. 5b (including partial views 5b-1 and 5b-2) is a flowchart depicting a method for managing SCPTM services, according to embodiments as disclosed herein; and FIG. 6 depicts an example reception of updated SC-MCCH duration, according to embodiments as disclosed herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments of the present disclosure relate to Single-Cell Point-to-Multipoint (SCPTM) communications. Multicast transmission in SCPTM can be performed over a Physical Downlink Shared Channel (PDSCH). Each service transmitted over SCPTM can be mapped to a Group-Radio Network Temporary Identifier (G-RNTI). A group of users can decode a service using the G-RNTI assigned or mapped to the service. For example, the G-RNTI may be used to scramble a cyclic redundancy check (CRC) code of a messages, so that a device that does not have the correct G-RNTI may not be able to decode the message.

In some examples, a G-RNTI is allocated to one or more UEs based on temporary mobile group identity (TMGI) according to a cell list given from the core network. A base station (i.e., an evolved Node B (eNB)) then transmits the group data through the physical downlink shared channel (PDSCH) and sends the corresponding downlink control information (DCI) through the physical downlink control channel (PDCCH) along with the G-RNTI.

UEs can decode both the DCI and the group data based on the G-RNTI. In some cases, the UEs in a group can acquire their G-RNTI from an SCPTM configuration message, which is periodically broadcasted through the Single Cell-MCCH (SC-MCCH), which provides the mapping between TMGIs and G-RNTIs. Since the SCPTM allows multiple UEs to receive the group data as in the PMCH case, it only requires a single radio resource allocation for disseminating the group data without duplicated data transmissions.

Since the SC-PTM does use duplicated data transmissions for group communication, it consumes fewer radio resources. In addition, SCPTM may enable more effective management of radio frames by multiplexing group data with the unicast data.

In some cases, group communication through SCPTM may have a smaller latency delay because it avoids queueing delays associated with PDSCH and the physical multicast channel (PMCH) transmissions. That is, since duplicated transmission is not needed, data queueing due to a radio resource shortage can be reduced (when there are enough UEs in each group). In some cases, group data may be transmitted through the PDSCH to avoid delays due to scheduling a multicast/multicell coordination entity (MCE).

$3^{rd}$ Generation Partnership Project (3GPP) standards specify that a maximum of 1024 services can be scheduled in a cell. The services can be scheduled in parallel, and some services can overlap or be disjoint. For example, the services can overlap if they are scheduled at the same time. If a UE is capable of receiving multiple services, then the overlapping scenario can be properly handled. This is because the capability of the UE enables decoding multiple G-RNTIs at the same time. However, the number of G-RNTIs or services supported simultaneously over SCPTM may be limited by factors such as memory, hardware capability, power consumption, device limitations, and so on. SCPTM may be configured via a system control channel such as the Single Cell-Multicast Control Channel (SC-MCCH).

Changes in the system information (i.e., to indicate changes in the SC-MCCH duration) may be indicated via paging messages, and all UEs may receive the same system information broadcast (SIB) message (i.e., SIB 20) and decode it. However, some of the UEs may not be using any SCPTM service. Therefore, for such UEs, receiving and decoding the SIB 20 may involve unnecessary power consumption.

Thus, the present disclosure provides systems and methods for managing reception of SCPTM services. For example, embodiments of the present disclosure provide for assigning priorities to different SCPTM services to be received, and selecting the SCPTM services to be received based on the priorities if there is an overlap in scheduling of the SCPTM services to be received, wherein the assigned priorities can be either static or dynamic.

Embodiments of the present disclosure also provide for using at least one SCPTM service over unicast if at least one SCPTM service cannot be availed in multicast mode. Embodiments of the present disclosure also provide for allowing a network or evolved Node B (eNB) to manage or optimize scheduling the reception of SCPTM services. Embodiments of the present disclosure also provide for receiving information about changes in SC-MCCH duration from Downlink Control Information (DCI) in the Physical Downlink Control Channel (PDCCH).

Embodiments herein disclose methods and systems for managing and optimizing reception of Single Cell Point to Multipoint (SCPTM) services. The embodiments include assigning priorities to different SCPTM services. The embodiments include providing cross-layer identifiers which facilitate the lower layers to identify attributes of a specific SCPTM service that is being received. The embodiments allow exchange of information between the higher and lower layers. The information includes attributes of the received SCPTM services. The attributes can be lossy/lossless operation, criticality, delay sensitivity, special services, and so on. Based on the attributes of different SCPTM services, the priorities can be assigned accordingly. The priorities can be communicated to the lower layers. Based on the priorities, the lower layers can choose to decode services having greater priority in comparison with services assigned with lower priority. The lower layers can exercise the choice when there is an overlap in scheduling the services (services are received at the same time) assigned with differing priorities.

Embodiments include availing services over unicast if the services cannot be availed over SCPTM. In an embodiment, a trigger can be sent to a middleware/application for indicating inability to schedule a service.

Embodiments include utilizing at least one Radio Frequency (RF) carrier for decoding at least one service. The embodiments include availing services from neighboring cells by synchronizing RFs with the neighboring cells, wherein the services availed from the neighboring cells can be decoded through the RFs.

Embodiments include providing information to the network about number of services that can be simultaneously decoded. Based on this information, the network can optimize the scheduling of at least one service.

Embodiments include decoding transmissions comprising of a plurality of services multiplexed in a higher layer payload with embedded identifiers. The multiplexing can be performed by the network. The decoding can be performed by the UE at the lower layers. At the higher layers, the decoded transmissions can be de-multiplexed to retrieve the individual services. The higher layer can be Long Term Evolution (LTE) protocol layer 2, or Transport Control Protocol/Internet Protocol (TCP/IP), application layer, and so on.

The embodiments include decoding multiple services through multiple antennas, wherein the services can be spatially multiplexed by the network and indicated by DCI on single G-RNTI.

The embodiments include using Downlink Control Information (DCI) for notifying changes in duration of Single Carrier-Multicast Control Channel (SC-MCCH).

Figure 1:
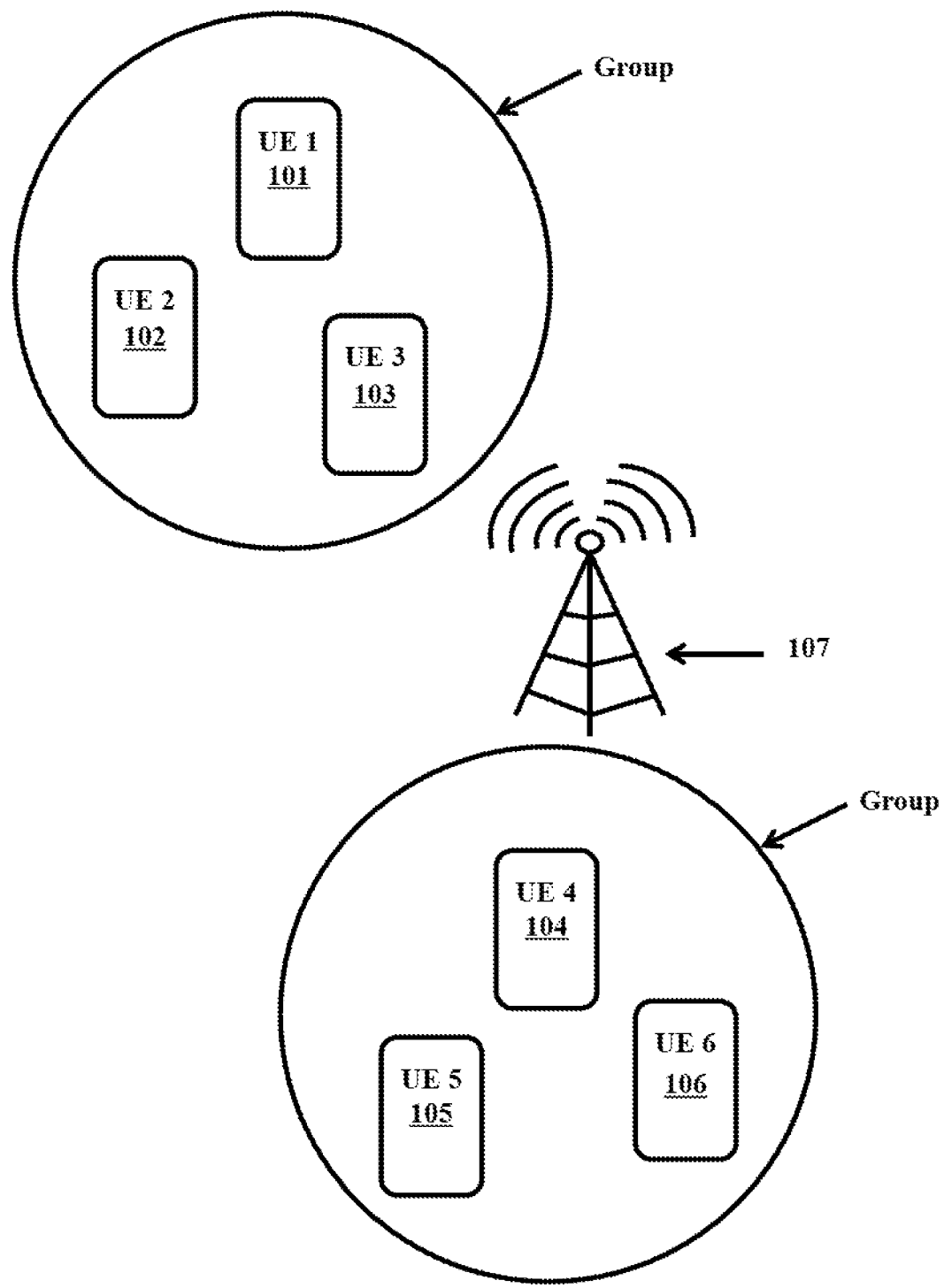
FIG. 1 depicts a grouping of User Equipment (UE) receiving different types of Single-Cell Point-to-Multipoint (SCPTM) services.

FIG. 1 depicts different groups of UEs receiving different types of SCPTM services. Each service is mapped to a G-RNTI. As depicted in FIG. 1, UE1 101, UE2 102, and UE3 103 are receiving a first service and are grouped together in a first group. The first service is associated with a first G-RNTI. Similarly, UE4 104, UE5 105, and UE6 106 are receiving a second service and are grouped together in a second group. The second service can be associated with a second G-RNTI. The first and second services can be received from an evolved Node B (eNB) 107, with which UE1-UE6 (101-106) are connected.

However, if critical information is transmitted through a third service while the UEs (101-106) are receiving the first and second services (i.e., overlap between first/second service and third service), there is a possibility that one or more of the UEs (101-106) may miss the critical information. This is because the G-RNTI based data decoding is handled by lower layers, which might not be aware of the criticality of the third service, and therefore may refrain from decoding the third service.

Figure 2:
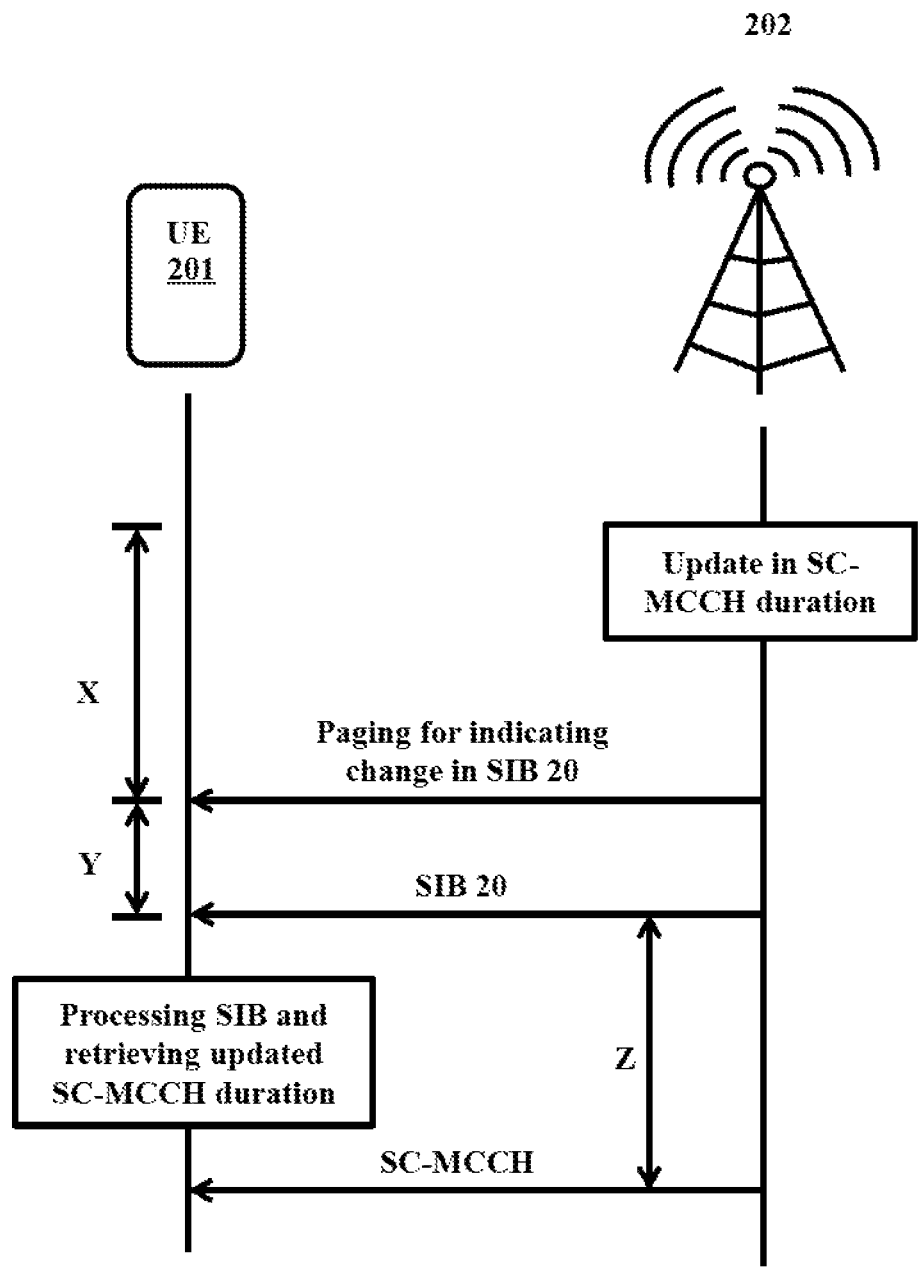
FIG. 2 depicts the latency in receiving information about change in SC-Multicast Control Channel (SC-MCCH) duration.

FIG. 2 depicts the latency in receiving information about a change in Single Cell Multicast Control Channel (SC-MCCH) duration. That is, for different SCPTM services, the SC-MCCH duration can be different. As the resource allocation in SCPTM is dynamic and as the types of services that can be provided to the UE 201 over SCPTM may also change with time, the size of SC-MCCH may vary. The eNB 202 or the core network may be responsible for informing the UE 201 about any variations in the size of SC-MCCH. Updates in the size of SC-MCCH can be conveyed to the UE 201 by initially sending a paging message followed by a System Information Block (SIB) 20 message. The SIB 20 message can indicate the SC-MCCH duration or the variation in the SC-MCCH duration. The UE 201 can become aware of the updated SC-MCCH duration by decoding the SIB 20 message.

However, there can be latency in receiving the updated SC-MCCH duration. For example, the latency can be a result of the decoding and reading time of the SIB 20 message, the duration of a Discontinuous Reception (DRX) cycle, a processing delay at the UE 201, and so on. The processing delay can include a delay in the acquisition of the SC-MCCH and a delay in the configuration for reception of the SC-MCCH.

In some cases, the eNB 202 may change the duration of SC-MCCH. Once the change has been performed, as depicted in FIG. 2, the eNB 202 sends a paging message to the UE 201 to indicate that there are changes in the system information. This may take duration 'X'. Herein, 'X' is dependent on the DRX cycle duration. Thereafter, the eNB sends a SIB 20 message, which can indicate the updated SC-MCCH duration. The SIB 20 message may arrive at the UE after the 'Y' duration. The UE may process and decode the SIB 20 message and obtain the updated SC-MCCH duration. The receiving, decoding, and processing of the SIB 20 message can be of 'Z' duration. Therefore, the latency in receiving information about change in SC-MCCH duration is 'X+Y+Z' duration.

For services such as a Vehicle to Everything (V2X) service, the SC-MCCH modification period may be about 40 ms, i.e., there is a possibility of having variations in SC-MCCH duration every 40 ms or greater. If the duration 'X+Y+Z' is more than 40 ms, then can be a possibility that the UE may miss the SC-MCCH. In $5^{th}$ Generation (5G) New Radio (NR) communication systems, the system information may not be broadcasted continuously, thereby limiting the delivery of notifications indicating changes in SC-MCCH duration.

Figure 3:
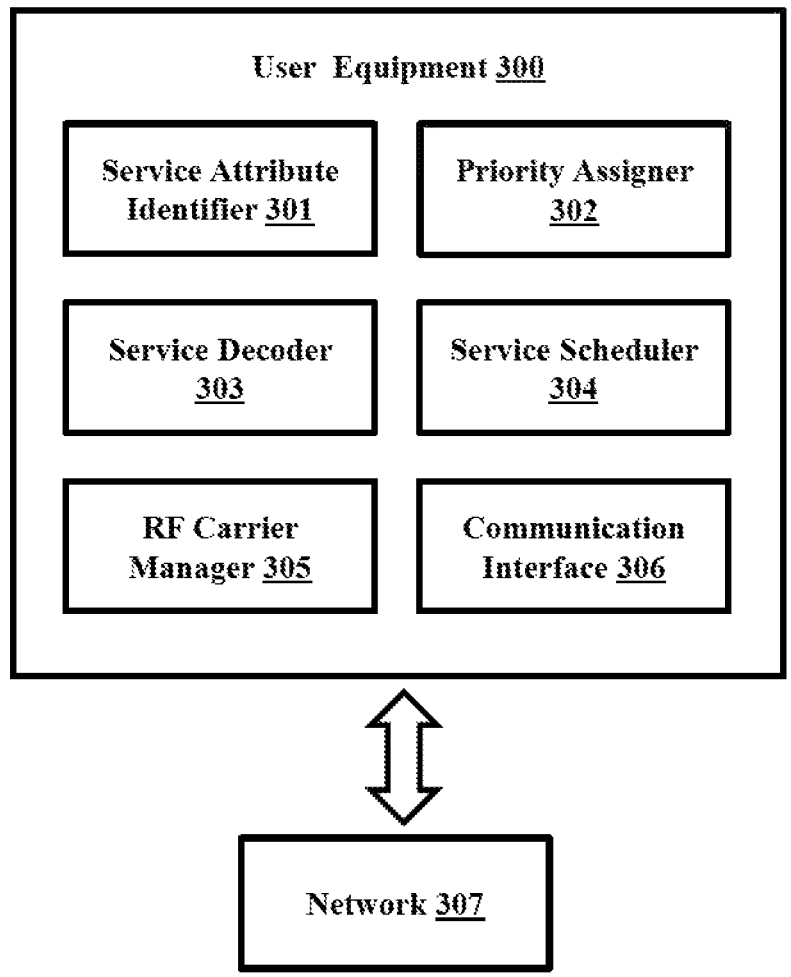
FIG. 3 depicts various units of a UE for managing SCPTM services, according to embodiments as disclosed herein.

Referring now to FIGS. 3 through 6, there are shown example embodiments to address the issues described herein. Similar reference characters may denote corresponding features in FIGS. 3 through 6 and throughout the figures, FIG. 3 depicts various units of a User Equipment (UE) 300 for managing SCPTM services, according to embodiments as disclosed herein. As depicted in FIG. 3, the UE 300 comprises of a service attribute identifier 301, a priority assigner 302, a service decoder 303, a service scheduler 304, an RF carrier manager 305, and a communication interface 306. The UE 300 can be connected to a network 307. The UE 300 may represent a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The service attribute identifier 301 can identify at least one attribute of the SCPTM services that are to be received by the UE 300. The service attribute identifier 301 can manage functions performed by the different layers of the communication system such as the application layer, the transport layer, physical layer, and so on. The service attribute identifier 301 can serve as a medium of communication between the different layers. The UE 300 can configure a service, if it intends to receive a particular SCPTM service. Examples of SCPTM services include, but are not limited to, public safety, streaming, download, Vehicle to Everything (V2X), further-enhanced Machine-Type Communication (FeMTC), and so on.

The service attribute identifier 301 can identify attributes of the services such as service type (V2X, public safety, and so on), operational requirement (e.g., whether the service can be operated in lossy medium or whether operation requires a lossless medium), criticality (whether service transmission includes critical content or not), sensitivity (whether service transmission includes sensitive content or not), specialty (whether service type is special or not), and so on. The attributes associated with the SCPTM can be identified at the higher layers of the communication system such as the application layer and the transport layer. The higher layers can associate the attributes to the different services based on configuration as received from either of the network, user, applications providing the service; or pre-configured, static set of attributes associated with the service types; and so on.

The service attribute identifier 301 can determine whether SCPTM services are available in neighboring cells. In some cases, the UE 300 intends to configure services for reception that are not available in a primary cell in which the UE 300 is currently camped. In such situations, the service attribute identifier 301 can determine whether the services are available in the neighboring cells.

The priority assigner 302 can assign priorities to the different services based on the attributes identified by the service attribute identifier 301. The priority assigner 302 can function at upper layers of the communication system such as the application layer and the transport layer. The priority can be based on the nature of the service configured by the network, user, or application. Additionally or alternatively, the service can be preconfigured. The priority assigner 302 can assign priorities to all SCPTM services that have been configured by the UE 300 for reception. The assigned priorities can be static or dynamic. If the assigned priorities are static, the priorities remain the same across time. On the other hand, if the assigned priorities are dynamic, the priorities assigned to the different services may change over time. The priority assigner 302 can communicate the assigned priorities to the service attribute identifier 301. The service attribute identifier 301 can communicate with the lower layers such as physical layer, Media Access Control (MAC) layer, and Radio Resource Control (RRC). Based on the attributes of the services received by the lower layers from the upper layers, the lower layers can choose to decode services with a higher priority. The lower layers can exercise the choice of decoding at least one service if there is a conflict in scheduling the decoding the services.

The service decoder 303 can decode services which have been configured by the UE 300 for reception. Each service is mapped to a G-RNTI (Group-Radio Network Temporary Identifier). The UE 300 can decode a service by decoding the physical channel using G-RNTI mapped to the service. Based on the hardware capability, memory, features, power consumption, and so on, the UE 300 can provide support for decoding a predefined number of G-RNTIs simultaneously, i.e., the UE 300 can receive a predefined number of services at the same time.

The service scheduler 304 can schedule the reception of services. In an embodiment, the service scheduler 304 can manage function(s) at the higher layers. If there is a conflict in receiving services configured by the UE 300, the service scheduler 304 can schedule the reception of the services based on the priorities assigned to the services.

For example, if the UE 300 can decode four G-RNTIs at the same time and the UE 300 is receiving four services, the service scheduler 304 can schedule the reception of the four services. However, if the UE 300 configures a fifth service, the service scheduler can inform the service attribute identifier 301 that the number of services to be received is greater than the number of services that the UE 300 can decode at the same time. When the priorities assigned to the services is communicated between the different layers, if the fifth service has a higher priority in comparison to one of the other four services currently being received by the UE 300; then reception of the service with the lowest priority among the four services is suspended to facilitate decoding and scheduling the fifth service.

The RF carrier manager 305 can manage reception of SCPTM services using RF carriers. In an embodiment, the SCPTM services can be received using a single RF carrier or multiple RF carrier(s). Each RF carrier can be utilized for receiving at least one service. The RF carrier manager 305 can assign at least one RF carrier over which the services can be received. The RF carrier manager 305 can synchronize the RF carrier(s) with a primary cell.

The service scheduler 304 can determine whether the number of services to be received through a single RF carrier is greater than the number of services that can be scheduled for reception through a single carrier. If the service scheduler 304 determines that the number of services to be received by the UE 300 through an RF carrier is greater than the number of services that can be received through the RF carrier, the RF carrier manager 305 can utilize another RF carrier to receive additional services.

The services can be received from either the primary cell or at least one neighboring cell. If a particular service configured for reception by the UE 300 is not provided by the primary cell, then the UE 300 can receive the service from a neighboring cell (if the neighboring cell is providing the service). The service from the neighboring cell can be received using an RF carrier different from the RF carrier through which the UE 300 is receiving at least one service from the primary cell. The RF carrier manager 305 can issue the RF carrier through which services are received from the neighboring cell.

If the network 307 schedules the services configured by the UE 300 for reception, the communication interface 306 can inform THE network 307 about the number of G-RNTIs that can be decoded simultaneously by the UE 300. In an embodiment, the information can be sent to the network 307 in an enhanced Multimedia Broadcast Multicast Service (eMBMS) interest indication message. The network 307 can optimize the scheduling of services based on the information received from the UE 300. The communication interface 306 can receive at least one service from the network 307. The received at least one service can be decoded by the service decoder 303 by decoding at least one G-RNTI mapped to the at least one service.

In an embodiment, the network 307 can multiplex multiple services using a single G-RNTI. The communication interface 306 can receive the transmission and the service decoder 303 can decode the G-RNTI. At the higher levels, the service scheduler 304 in the UE 300 can de-multiplex the transmission and schedule the services. The service attribute identifier 301 can identify the services that have been de-multiplexed.

In an embodiment, the network 307 can spatially multiplex the services that are configured by the UE 300. The spatially multiplexed services can be mapped to a single G-RNTI. For example, the communication interface 306 of a UE 300 equipped with a Multiple Input Multiple Output (MIMO) system can receive the spatially multiplexed services from the network 307. MIMO wireless systems may use a transmission scheme between a transmitter (e.g. a base station) and a receiver (e.g. UE), where both transmitter and receiver are equipped with multiple antennas. Some portions of a wireless communications system may also use beamforming. An eNB of network 307 may have an antenna array with a number of rows and columns of antenna ports that the eNB may use for beamforming in its communication with UE 300. Signals may be transmitted multiple times in different directions (e.g., each transmission may be beamformed differently). In some examples, a mmW receiver may utilize multiple beams (e.g., antenna subarrays).

In an embodiment, the communication interface 306 can monitor DCI in Physical Downlink Control Channel (PDCCH) to determine whether there is any variation in the SC-MCCH. The DCI can include bits that indicate information including, but not limited to, changes in the duration of the SC-MCCH, a new duration of SC-MCCH, and so on.

FIG. 3 shows exemplary units of the UE 300, but it is to be understood that other embodiments are not limited thereto. In other embodiments, the UE 300 may include a greater or lesser number of units. Further, the labels or names of the units are used only for illustrative purpose and do not limit the scope of the invention. One or more units can be combined together to perform same or substantially similar function in the UE 300.

For example, UE 300 may include a processor, a memory, and a transceiver.

A processor may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). The processor may be configured to execute computer-readable instructions stored in a memory to perform various functions. In some examples, a processor may include special purpose components for modem processing, baseband processing, digital signal processing, or transmission processing. In some examples, the processor may comprise a system-on-a-chip.

The memory may store information for various programs and applications on a computing device. For example, the storage may include data for running an operating system. The memory may include both volatile memory and non-volatile memory.

A transceiver may communicate bi-directionally, via antennas, wired, or wireless links. For example, the transceiver may represent a wireless transceiver and may communicate bi-directionally with another wireless transceiver. The transceiver may also include or be connected to a modem to modulate the packets and provide the modulated packets to for transmission, and to demodulate received packets. In some examples, transceiver may be tuned to operate at specified frequencies. For example, a modem can configure the transceiver to operate at a specified frequency and power level based on the communication protocol used by the modem.

For example, network 307 may be a packet-based network that operates according to a layered protocol stack. In the user plane, communications at the bearer, or Packet Data Convergence Protocol (PDCP), layer may be IP-based. A Radio Link Control (RLC) layer may perform packet segmentation and reassembly to communicate over logical channels. A Medium Access Control (MAC) layer may perform priority handling and multiplexing of logical channels into transport channels.

The MAC layer may also use Hybrid ARQ (HARQ) to provide retransmission at the MAC layer to improve link efficiency. In the control plane, a Radio Resource Control (RRC) protocol layer may provide establishment, configuration, and maintenance of an RRC connection between the UE 300 and network 307. At the Physical (PHY) layer, transport channels may be mapped to physical channels.

Figure 4:
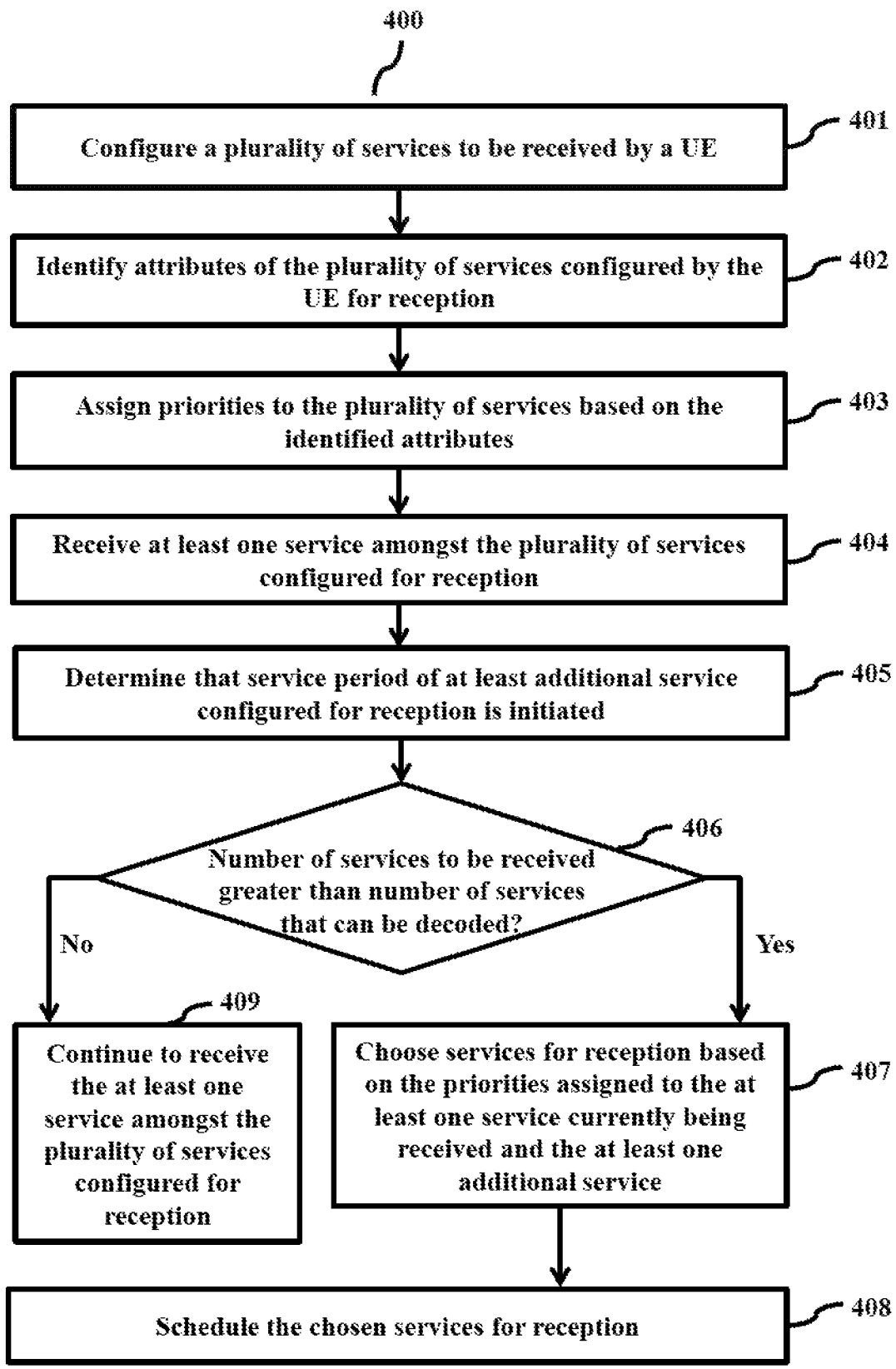
FIG. 4 is a flowchart depicting a method for managing SCPTM services, according to embodiments as disclosed herein.

FIG. 4 is a flowchart 400 depicting a method for managing SCPTM services, according to embodiments as disclosed herein. Aspects of the process described by flowchart 400 may be performed by a UE 300 as described above with reference to FIG. 3.

At step 401, the method includes configuring a plurality of services to be received by the UE 300. At step 402, the method includes identifying attributes of the plurality of services configured by the UE 300. The attributes may include service type, criticality, specialty, operational requirement, sensitivity, and so on. The SCPTM services include public safety, streaming, download, V2X, FeMTC, and so on. The attributes are indicated with the identifiers which are shared along with the configuration and setup of the services from higher layers to the underlying layers or modules, i.e., inter-layer primitives.

At step 403, the method includes assigning priorities to the plurality of services configured by the UE 300 for reception. The priorities can be assigned to each of the plurality of services based on the identified attributes. In some cases, the priorities assigned to the plurality of services can be static, wherein the priorities assigned to the plurality of services are constant. In other cases, the priorities assigned to the plurality of services can be dynamic, wherein the priorities assigned to each of the plurality of services can change over time. In an example, if the priority assigned is dynamic then a service assigned currently with a lower priority can be later assigned with a higher priority or vice-versa. At step 404, the method includes receiving at least one service amongst the plurality of configured services.

At step 405, the method includes determining that the service period of at least one additional service configured for reception has been initiated. The UE 300 may receive the at least one additional service whose service period (i.e. a scheduling period of the service) has been initiated. If the at least one additional service is critical, then the requirement for receiving the at least one additional service can be higher than that of an existing service. The number of services to be received by the UE 300 at this stage increases.

At step 406, the method includes determining whether the number of services to be received by the UE 300 is greater than a number of services (which may be associated with different G-RNTIs) that the UE 300 can decode simultaneously. That is, based on hardware of software capabilities, the UE may have a limit on the number of services it can receive at the same time. Each service can be mapped to a particular G-RNTI. Therefore, in order to decode a particular service, the UE 300 may decode the DCI associated with the G-RNTI mapped to that service.

If it is determined that the number of services to be received by the UE 300 is greater than a number of services that can be decoded simultaneously by the UE 300, then, at step 407, the method includes choosing services for reception based on the priorities assigned to the at least one service currently being received and the priority of the at least one additional service. In an embodiment, the services that are assigned with higher priorities can be chosen for reception and decoding. The number of services chosen for reception and decoding can be equal to the number of services that can be decoded simultaneously by the UE 300.

In an example, the UE 300 supports decoding of two G-RNTIs at the same time and two services are currently being received by the UE 300. If the service period of a third service is initiated, then the method includes comparing the priorities of the two services that are being received with the priority of the third service. If the third service has the lowest priority, then the third service is not chosen for reception and decoding. However, if the assigned priority of the third service is greater than the priority of one or two services that are currently being received, then the third service is chosen for reception and decoding and the reception of the service (currently being received) with the lowest priority is suspended.

At step 408, the method includes scheduling the chosen services for reception. The scheduled services can be decoded by decoding the G-RNTIs mapped to the services.

If it is determined, at step 406, that the number of services currently being received by the UE 300 is less than the number of services that can be decoded simultaneously, then, at step 409, the UE 300 can continue to receive the at least one service.

Thus, by taking into account the priority of different services, a UE 300 can avoid missing critical information available in a new service when it is already at capacity (i.e., for the number of services it can receive). That is, a lower priority service can be dropped (i.e., not received) if a higher priority service becomes available.

The various actions in the flowchart 400 may be performed in the order presented, in a different order, or simultaneously. Further, in some embodiments, some actions listed in FIG. 4 may be omitted.

FIG. 5a is a flowchart 500a depicting a method for managing SCPTM services, according to embodiments as disclosed herein. Aspects of the process described by flowchart 500a may be performed by a UE 300 as described above with reference to FIG. 3.

At step 501a, the method includes receiving at least one SCPTM service through a first RF carrier. The number of services that can be received by the UE 300 through a single RF carrier can be based on attributes of the UE 300 such as hardware capability, power consumption, memory, features, and so on. The first RF carrier, through which the at least one service is received, can be synchronized with a primary cell.

At step 502a, the method includes determining that the service period of at least one additional service configured for reception has been initiated. At step 503a, the method includes determining whether the number of services to be received through the first RF carrier is greater than the number of services that can be received through the first RF carrier. In an example, consider that three services can be received through the first RF carrier and three services are being currently received through the first RF carrier.

If the number of services to be received by the UE 300 is greater than the number of services that can be simultaneously received by the UE 300 through the first RF carrier, then, at step 504a, the method includes synchronizing a second RF carrier with the primary cell for receiving the at least one additional service. Considering the above example, if the service period of a fourth service is initiated while the UE 300 is receiving the three services through the first carrier; then the embodiments include synchronizing the second RF carrier with the primary cell for receiving the fourth service.

At step 505a, the method includes scheduling the reception of the at least one service through the first RF carrier and the at least one additional service through the second RF carrier.

If the number of services to be received by the UE 300 is less than the number of services that can be simultaneously received through the first RF carrier, the method includes, at step 506a, continuing the reception of the at least one service through the first RF carrier.

The various actions in the flowchart 500a may be performed in the order presented, in a different order, or simultaneously. Further, in some embodiments, some actions listed in FIG. 5a may be omitted.

FIG. 5b (including partial views 5b-1 and 5b-2) is a flowchart 500b depicting a method for managing SCPTM services, according to embodiments as disclosed herein. The functionalities of steps 501b-505b are similar to the steps 501a-506a described in FIG. 5a. For the sake of brevity, the steps have not been repeated here.

At step 507b, the method includes determining the availability of at least one new SCPTM service in the primary cell. For example, the UE 300 may be receiving a V2X service and an FeMTC service from the primary cell. Then the UE 300 may determine the availability of streaming service in the primary cell.

At step 508b, the method includes determining whether the at least one new service is being provided by the primary cell. If new service is not being provided, then the method includes, at step 509b, synchronizing a third RF carrier with a neighboring cell where the new services are being provided. The first RF carrier, the second RF carrier, or both can also be synchronized with the neighboring cell to receive the new services. At step 510b, the method includes scheduling the reception of the new services from the neighboring cell. However, if the new services are available in the primary cell, the method may include, at step 511b, scheduling the reception of the new services from the primary cell.

The various actions in the flowchart 500b may be performed in the order presented, in a different order, or simultaneously. Further, in some embodiments, some actions listed in FIG. 5b may be omitted.

FIG. 6 depicts an example reception of updated SC-MCCH duration, according to embodiments as disclosed herein. As depicted in the example in FIG. 6, the network 307 is represented by an eNB. The network 307 can update the variation of the SC-MCCH duration of a SCPTM service during a modification period. The network 307 can convey information about the update of the SC-MCCH duration to the UE 300. The embodiments include conveying the information in unused bits of the DCI used for indicating the update of SC-MCCH. The UE 300 can be configured to monitor the DCI for receiving notifications about variations in the SC-MCCH duration at every modification period boundary. In an example embodiment, the UE 300 can decode the DCI using Single Cell-RNTI (SC-N-RNTI)

Indicating the variation in SC-MCCH duration in the DCI can prevent the UE 300 from missing the SC-MCCH if the modification period is short. It can also minimize power consumption of UEs not using the SCPTM services, as only those UEs which are receiving SCPTM services need to monitor the DCI. This can be used for V2X, New Radio (NR) broadcast and unicast, and so on.

In an embodiment, for low bandwidth systems when it is not feasible to accommodate sufficient bits in the DCI to indicate the updated SC-MCCH duration information, the indication may be limited to the change of SC-MCCH duration. The UE 300 can decode the SC-MCCH in the sub-frames until the UE 300 is able to decode the sub-frames with SC-MCCH decoding parameters such as Modulation and Coding Scheme (MCS). The UE 300 can thereafter combine or reassemble the received SC-MCCH in the successfully decoded sub-frames and compose the SC-MCCH message.

The embodiments disclosed herein can be implemented through at least one software program running on at least one hardware device and performing network management functions to control the network elements. The network elements shown in FIG. 3 include blocks which can be at least one of a hardware device, or a combination of hardware device and software module.

The embodiments disclosed herein describe methods and systems for managing and optimizing reception of SCPTM services, Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL), another programming language, or implemented by one or more VHDL or several software modules being executed on at least one hardware device. The hardware device can be any kind of portable device that can be programmed. The device may also include means which could be e.g. hardware means like e.g. an application specific integrated circuit (ASIC), or a combination of hardware and software means, e.g. an ASIC and a field programmable gate array (FPGA), or at least one microprocessor and at least one memory with software modules located therein. The method embodiments described herein could be implemented partly in hardware and partly in software. Alternatively, the invention may be implemented on different hardware devices, e.g. using a plurality of central processing units (CPUs).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for managing reception of Single Cell Point to Multipoint (SCPTM) services, the method comprising:
    assigning, by a User Equipment (UE), priorities to SCPTM services configured for reception by the UE;
    determining, by the UE, if a number of SCPTM services to be received by the UE is greater than a number of SCPTM services supported by the UE for reception, wherein the number of SCPTM services to be received by the UE comprises a number of SCPTM services currently being received by the UE and at least one additional SCPTM service whose service period is being initiated, wherein the initiation of the service period indicates a requirement to receive the at least one additional SCPTM service; and
    selecting, by the UE, SCPTM services to be received by the UE amongst the SCPTM services currently being received by the UE and the at least one additional SCPTM service based on the priorities assigned to the SCPTM services currently being received by the UE and a priority assigned to the at least one additional SCPTM service, wherein a number of selected SCPTM services is less than or equal to the number of SCPTM services supported by the UE for reception.

2. The method of claim 1, wherein the assigning of the priorities to the SCPTM services configured for reception comprises:
    identifying, by the UE, at least one attribute of the SCPTM services configured for reception; and
    assigning, by the UE, the priorities to the SCPTM services configured for reception based on the identified at least one attribute of the SCPTM services configured for reception.

3. The method of claim 2, wherein the method further comprises communicating the priorities assigned to the SCPTM services configured for reception across different layers, wherein the layers are physical layer, Media Access Control (MAC) layer, Transport Control Protocol/Internet Protocol (TCP/IP) layer, and application layer.

4. The method of claim 2, wherein the at least one attribute of the SCPTM services configured for reception comprises operational requirement, SCPTM service type, criticality, sensitivity and specialty.

5. The method of claim 1, wherein the priorities assigned to the SCPTM services configured for reception comprise an attribute of being static or dynamic.

6. The method of claim 1, wherein the number of SCPTM services supported by the UE for reception is based on at least one attribute of the UE, wherein the at least one attribute includes a hardware capability, memory, features, power consumption, or any combination thereof.

7. The method of claim 1, wherein the method further comprises:
    receiving, by the UE, the SCPTM services through a first Radio Frequency (RF) carrier, wherein the first RF carrier is synchronized with a primary cell;
    synchronizing, by the UE, a second RF carrier with the primary cell for receiving the at least one additional SCPTM service not supported by the first RF carrier; and
    receiving, by the UE, the at least one additional SCPTM service through the second RF carrier.

8. The method of claim 7, wherein the method further comprises:
    determining, by the UE, that the SCPTM services are provided by a neighboring cell, wherein the SCPTM services are not provided in the primary cell;

synchronizing, by the UE, at least one of the first RF carrier, the second RF carrier, and a third RF carrier for receiving the SCPTM services provided by the neighboring cell; and receiving, by the UE, the SCPTM services provided by the neighboring cell through at least one of the first RF carrier, the second RF carrier, and the third RF carrier.

9. A method for managing reception of Single Cell Point to Multipoint (SCPTM) services by a User Equipment (UE), the method comprising:

informing, by the UE to a network, a number of SCPTM services supported for reception by the UE;

selecting, by the UE, SCPTM services to be received by the UE from a plurality of SCPTM services based on the number of SCPTM services supported for reception by the UE; and receiving, by the UE, the selected SCPTM services from the network by selectively decoding the selected SCPTM services, wherein receiving the selected SCPTM services from the network comprises de-multiplexing decoded transmissions to retrieve each of the selected SCPTM services.

10. The method of claim 9, wherein the number of SCPTM services supported for reception by the UE is based on sending an enhanced Multimedia Broadcast Multicast Service (eMBMS) interest indication message to the network.

11. The method of claim 9, wherein the de-multiplexing of each of the selected SCPTM services is performed by spatial de-multiplexing at least one of a physical layer, a Long Term Evolution (LTE) protocol layer 2, a Transport Control Protocol/Internet Protocol (TCP/IP) layer, and an application layer.

12. A User Equipment (UE) for managing reception of Single Cell Point to Multipoint (SCPTM) services, the UE configured to:

assign priorities to SCPTM services configured for reception by the UE;

determine if a number of SCPTM services to be received by the UE is greater than a number of SCPTM services supported by the UE for reception, wherein the number of SCPTM services to be received by the UE comprises a number of SCPTM services currently being received by the UE and at least one additional SCPTM service whose service period is being initiated, wherein the initiation of the service period indicates a requirement to receive the at least one additional SCPTM service; and select SCPTM services to be received by the UE amongst the SCPTM services currently being received by the UE and the at least one additional SCPTM service based on the priorities assigned to the SCPTM services currently being received by the UE and the priorities assigned to the at least one additional SCPTM service, wherein a number of selected SCPTM services is less than or equal to the number of SCPTM services supported by the UE for reception.

13. The UE of claim 12, wherein assigning priorities to the SCPTM services configured for reception comprises:

identifying at least one attribute of the SCPTM services configured for reception; and assigning the priorities to the SCPTM services configured for reception based on the at least one identified attribute of the SCPTM services configured for reception.

14. The UE of claim 13, wherein the at least one attribute of the SCPTM services configured for reception comprises an operational requirement, an SCPTM service type, a criticality, a sensitivity, a specialty, or any combination thereof.

15. The UE of claim 12, wherein the UE is further configured to communicate the priorities assigned to the SCPTM services configured for reception across different layers, wherein the layers comprise a physical layer, a Media Access Control (MAC) layer, a Transport Control Protocol/Internet Protocol (TCP/IP) layer, an application layer, or any combination thereof.

16. The UE of claim 12, wherein the priorities assigned to the SCPTM services configured for reception comprise an attribute of being static or dynamic.

17. The UE of claim 12, wherein the number of SCPTM services supported by the UE for reception is based on at least one attribute of the UE, wherein the at least one attribute includes a hardware capability, memory, features, power consumption, or any combination thereof.

18. The UE of claim 12, wherein the UE is further configured to:

receive the SCPTM services through a first Radio Frequency (RF) carrier, wherein the first RF carrier is synchronized with a primary cell;

synchronize a second RF carrier with the primary cell for receiving the at least one additional SCPTM service not supported by the first RF carrier; and receive the at least one additional SCPTM service through the second RF carrier.

19. The UE of claim 18, wherein the UE is further configured to:

determine that the SCPTM services are provided by a neighboring cell, wherein the SCPTM services are not provided in the primary cell;

synchronize at least one of the first RF carrier, the second RF carrier, and a third RF carrier for receiving the SCPTM services provided by the neighboring cell; and receive the SCPTM services provided by the neighboring cell through at least one of the first RF carrier, the second RF carrier, and the third RF carrier.

* * * * *